Figure 1:
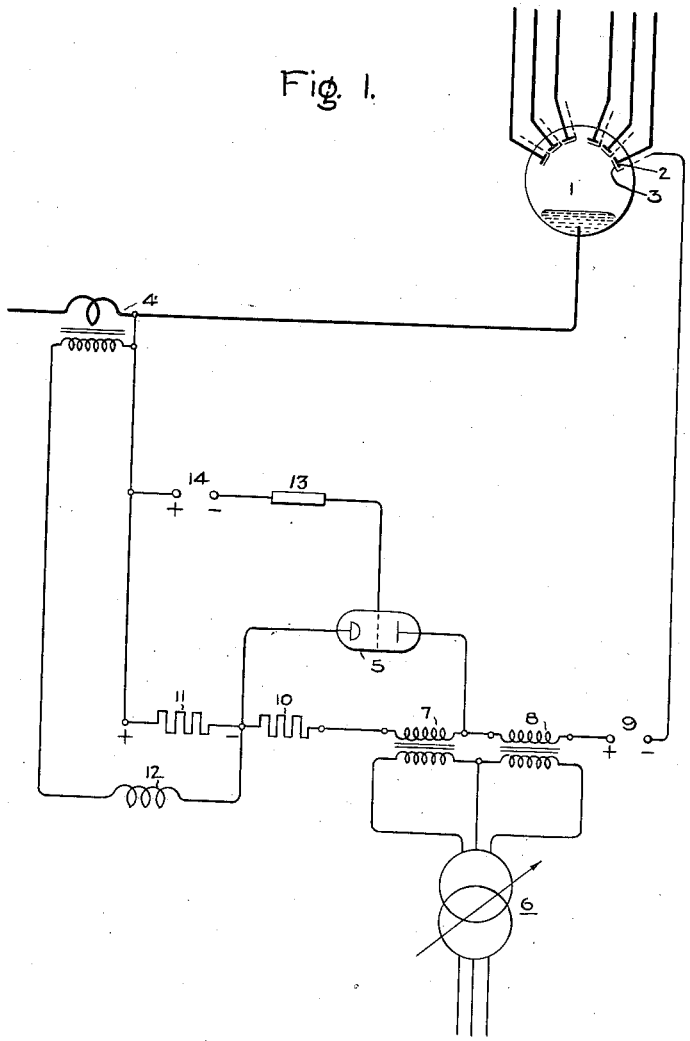

Patented May 9, 1939

2,157,851

UNITED STATES PATENT OFFICE 2,157,851

PROTECTIVE ARRANGEMENT FOR ELECTRIC VALVE CONVERTING SYSTEMS

Claus Fröhmer, Berlin-Siemensstadt, Germany, assignor to General Electric Company, a corporation of New York Application July 17, 1936, Serial No. 91,194
In Germany July 27, 1935

9 Claims. (Cl. 175—363)

The switching-off of short-circuits by means of grid control in continuous current networks fed by grid-controlled rectifiers entails the drawback that, owing to the high speed with which that switching-off takes place, the circuit breaker pertaining to that section in which the short-circuit has arisen remains closed so that the rectifier, after the blocking has been broken, is again connected to the short-circuit. The rectifier must then again be withdrawn from service by means of the grid control.

In view thereof it has already been proposed to abstain from switching-off the rectifier in the case where short-circuits occur in networks fed by grid-controlled rectifiers, and to reduce the continuous potential by means of the grid-control to a value at which the circuit breaker of the short-circuited branch will operate.

In such an arrangement it has been proposed to employ for the control of the grid a sine-wave alternating potential superimposed upon a variable continuous potential, the value of which depends upon the rate of rise of the continuous current, so that if the current rises the ignition of the individual anodes is retarded. This method cannot be used, however, if a periodic potential having an acute or a rectangular curve shape is employed.

Such a shape of the grid potential curve presents, however, considerable advantages for many applications. The present invention relates to a system for the selective switching-off of short-circuits in networks fed by grid-controlled rectifiers in which the grid control potential is an alternating potential having an acute or a rectangular curve shape superimposed upon a sine-wave alternating potential. The arrangement and combination of the parts concerned is such that in the case of a short-circuit arising the alternating potential with acute or rectangular curve shape is nearly completely rendered inactive, and that at the same time a continuous potential is superimposed on said sine-wave alternating potential, the strength of which decreases with the decreasing value of the short-circuit current. By rendering ineffective the alternating potential having an acute or a rectangular curve shape the ignition moment is displaced to nearly the end of the positive half-wave of the anode-potential. Owing to the slow decrease of the negative grid biasing potential which is dependent upon the rise of the current in the continuous current network the time of ignition is gradually advanced. As soon as the rate of rise of the current decreases below a certain predetermined value, the alternating potential having an acute or a rectangular curve shape again becomes effective so that the ignition of the individual anodes takes place within that period.

Figure 2:
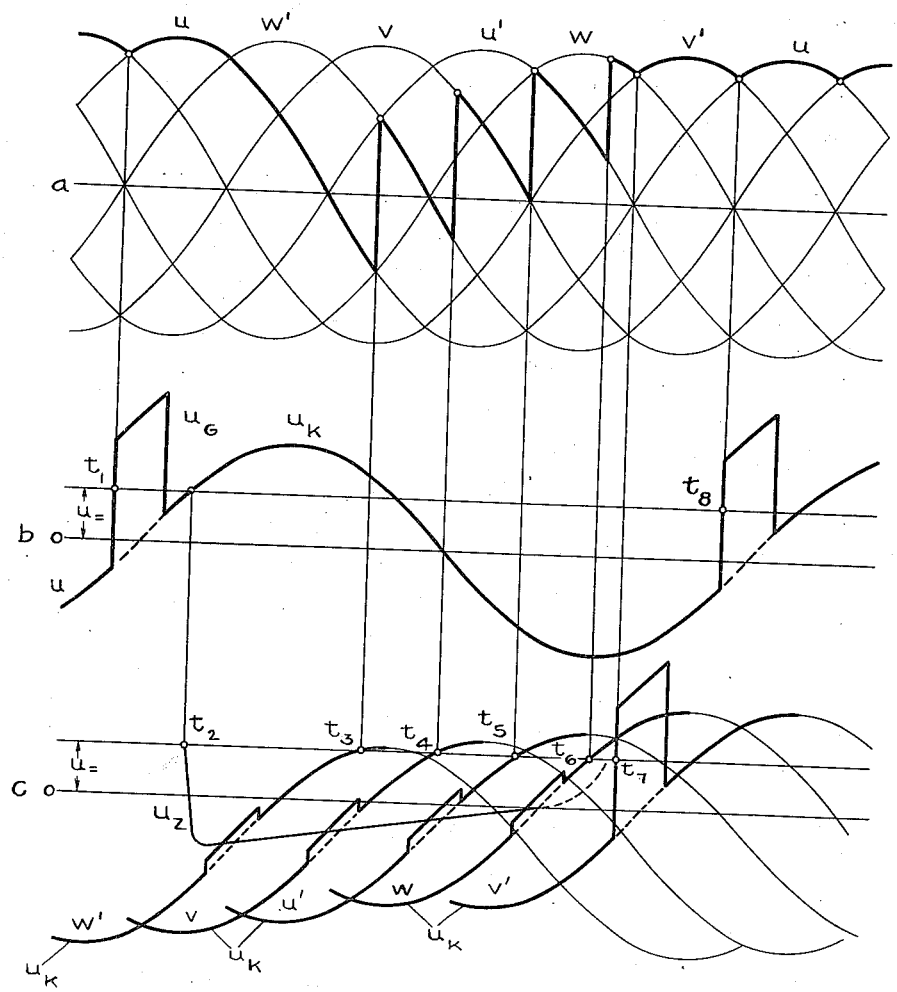

In order to make my invention clearer, I refer to the accompanying drawings on which Figure 1 shows an arrangement embodying this invention, and Figure 2 is a representation of curves pertaining thereto.

Referring to Fig. 1, there is disclosed a rectifier 1 having a plurality of anodes 2 each of which is provided with one of the grids 3. The rectifier receives energy from a suitable source of alternating current and supplies a continuous-current network. In the cathode circuit is a transformer 4, the secondary potential of which constitutes a measure for the rate of rise of current in the cathode circuit. As soon as the rate of rise of current has surpassed a certain value, there is generated in the secondary transformer circuit formed by the choking coil 12 and the resistance 11 a potential which overcomes the negative grid potential 14 of the gas or vapor discharge vessel 5 so that this vessel ignites. By this ignition the secondary side of the transformer 7 is short-circuited across the resistance 10 so that the alternating potential with its acute or rectangular curve shape as delivered by the transformer 7 is no longer effective. The ignition of the anodes is now determined only by the sine-wave alternating potential as delivered by the secondary coil of the transformer 8. Under certain circumstances it may be advantageous to superimpose a negative continuous potential upon said sine-wave alternating potential.

Referring now to the portion a of Fig. 2, curves $u$, $w'$, $v$, etc. denote the values of the various anode potentials. In the portion b of Fig. 2 is shown the curve of the sine-wave alternating potential $U_K$ which the transformer 8 generates and upon which is superimposed the alternating potential as produced by the transformer 7 having a rectangular curve shape $U_G$. Also superimposed upon the grid potential is the negative grid biasing potential $U=$ which is delivered by the source of potential 9. In normal operation the anode U ignites at the moment $t_1$. If, at the moment $t_2$, a short-circuit arises and the current rises rapidly with a high speed, then the potential $U_Z$ appearing across the grid resistance 11 increases, as shown in the portion c of Fig. 2. As soon as the potential $U_Z$ has attained, in spite of the negative grid biasing potential 14, a value sufficient for the ignition of the discharge vessel, the tube 5 ignites and short-circuits, through the resistance 10, the secondary side of the transformer 7 which delivers the grid potential U$_G$, so that the grid alternating potential effective upon the grid W' takes the course shown in the portion $c$ of Fig. 2. The ignition of the anode W' takes place at the moment $t_3$. Also the grid potentials U$_K$ which are active at the grids of the anodes V, U' and W show a similar course, as the coil of the transformer 7 which is short-circuited by the associated discharge-vessel 5 does not contribute to the grid potential. The negative biasing potential U$_Z$ decreases gradually with the decrease of the rate of rise of the current so that the anode V ignites at an earlier moment within its positive half cycle of voltage than does the anode W', viz. at the moment $t_4$. The ignition of the anodes U' and W is, owing to the decreasing negative biasing potential U$_Z$, still less retarded than is the ignition of the anodes W' and V. The ignition takes place at the moment $t_5$, or $t_6$ respectively. As illustrated in the portion $c$ of Fig. 2 the negative grid biasing potential U$_Z$ between the moments $t_5$ and $t_6$ is of such value that the discharge vessel 5 no longer ignites. In consequence thereof the grid alternating potential supplied to the anode V' consists of a sine-wave potential upon which again is superimposed the normal value of the alternating potential having a rectangular curve shape. The ignition of the anode V' takes place therefore, at the moment $t_7$ so that the current is commutated from anode W as soon as it has the higher anode potential.

It has been assumed in this example that the short-circuited section is switched-off in that interval of time lying between the moments $t_5$ and $t_6$, but this assumption is not a limitation upon the mode of operation. If, the switching-off would have taken place at an earlier moment, for instance in the interval between the moments $t_3$ and $t_4$, then the negative grid potential U$_Z$ would have become zero in this interval so that the rectangular grid alternating potential U$_G$ would again have become active.

Those skilled in the art will appreciate that, as a matter of course, grid transformers, grid biasing potential sources and auxiliary discharge vessels must be provided for every grid circuit, whereas only one transformer 4, one resistance 11, one choking coil 12, and one phase shifter 6, need be provided.

I claim:

1. A protective arrangement for the selective switching-off of short-circuits in networks fed by grid-controlled rectifiers, in which arrangement an alternating potential of acute or rectangular curve shape superimposed on a sine-shaped alternating potential is employed for controlling the grids, said protective arrangement being characterised by the feature that means are provided for rendering nearly completely ineffective said alternating potential of acute or rectangular curve shape in accordance with the rate of rise of short-circuit current whenever a short-circuit arises.

2. An electric valve converting system including a controlled electric discharge valve, means for periodically rendering conductive said valve, said means supplying energy of a certain wave form, means responsive to abnormal conditions in said system for changing the wave form of the energy supplied by said first means thereby to reduce the power output of said valve, and means for gradually changing said wave form to said first wave form whereby said valve output gradually returns to a normal value.

3. An electric valve converting system including an electric discharge valve provided with a control electrode, means for supplying said electrode with energy of a certain wave form derived from two alternating potential components to control the moment of ignition of said valve, means responsive to abnormal conditions of said system for retarding the moment of ignition of said valve sufficiently to limit the power output to a safe value, said means operating to reduce the magnitude of one of said alternating current components and means for gradually advancing the moment of ignition of said valve to gradually increase the power output to the original value, said means operating to gradually increase the magnitude of said last mentioned alternating current component.

4. In a protective arrangement for permitting switching off short-circuited sections in a network fed by controlled electric converting systems, the combination comprising a controlled electric valve converting apparatus, a control circuit for supplying to the valves thereof a control potential comprising a positive periodic potential of peaked wave form superimposed on a sine-wave alternating potential, and means responsive to abnormal current increases of said apparatus for rendering substantially ineffective said first mentioned alternating potential.

5. In a protective arrangement for permitting switching off short-circuited sections in a network fed by controlled electric valve converting systems, the combination comprising a controlled electric valve converting apparatus, a control circuit therefor for supplying to the valves thereof a control potential comprising an alternating potential of peaked wave form superimposed on a since-wave alternating potential, means responsive to short circuits in said network for rendering substantially ineffective said first mentioned alternating potential, and means responsive to abnormal current increases arising from short circuits for superimposing upon said resultant control potential a negative bias the magnitude of which decreases in accordance with the decrease in the rate of increase of said abnormal current increases.

6. The combination comprising a controlled electric valve converting apparatus, a control circuit including means for supplying to the valves thereof a control potential comprising an alternating potential of peaked wave form and means for supplying thereto a sine-wave alternating potential, means responsive to abnormal current increases of said apparatus for rendering substantially short circuited said means supplying said first mentioned alternating potential, and means responsive to said abnormal current increases for superimposing upon said resultant control potential a negative bias the magnitude of which decreases in accordance with the decrease in the rate of increase of said abnormal current increases.

7. The combination comprising a controlled electric valve converting apparatus, a control circuit comprising means for supplying to the valves thereof an alternating potential of peaked wave form and means for supplying thereto a sine-wave alternating potential, means responsive to abnormal current increases of said apparatus including an electric valve arranged across said means for supplying said alternating potential of peaked wave form, and a control circuit for said valve for rendering conductive said valve whenever said abnormal current increases exceed a predetermined rate of increase.

8. The combination comprising a controlled electric wave converting apparatus, a control circuit therefor including means for supplying to the valves thereof an alternating potential of peaked wave form and means for supplying thereto a sine-wave alternating potential, a normally nonconductive electric valve arranged in shunt relation to said first mentioned means, a control circuit for said electric valve arranged to be responsive to current increases of said apparatus in excess of a predetermined rate of increase thereby to render said electric valve conductive and to impress upon said control circuit a negative bias the magnitude of which decreases in accordance with the decrease in the rate of increase of said current increases.

9. The combination comprising a controlled electric valve converting apparatus, a control circuit supplying to the valves thereof a control potential comprising an alternating potential of peaked wave form superimposed upon a sine-wave alternating potential, means responsive to abnormal current increases of said apparatus for causing the conductivity of said apparatus to be controlled only by said sine-wave alternating potential, and means responsive to said abnormal current increases for superimposing upon said sine-wave alternating potential a negative bias the magnitude of which decreases gradually thereby to cause a gradual increase in the power output of said apparatus.

CLAUS FRÖHMER.

CERTIFICATE OF CORRECTION.

Patent No. 2,157,851.  May 9, 1939.

CLAUS FRÖHMER.

It is hereby certified that error appears in the printed specification of the above numbered patent requiring correction as follows: Page 2, second column, line 40, claim 5, for "since-wave" read sine-wave; page 3, first column, line 5, claim 8, for the word "wave" read valve; and that the said Letters Patent should be read with this correction therein that the same may conform to the record of the case in the Patent Office.

Signed and sealed this 20th day of June, A. D. 1939.

(Seal)

Henry Van Arsdale
Acting Commissioner of Patents.